United States Patent [19]

Shin

[11] Patent Number: 4,995,070
[45] Date of Patent: Feb. 19, 1991

[54] ELECTRONIC KEY TELEPHONE SET WITH FUNCTION OPERATION TEST FUNCTION AND METHOD OF CONTROLLING THE SAME

[75] Inventor: Kimitoshi Shin, Akishima, Japan
[73] Assignee: Kabushiki Kaisha Toshiba, Kawasaki, Japan
[21] Appl. No.: 410,355
[22] Filed: Sep. 21, 1989
[30] Foreign Application Priority Data
　Sep. 29, 1988 [JP] Japan .................................. 63-244831
[51] Int. Cl.$^5$ .............................................. H04M 1/24
[52] U.S. Cl. ........................................ 379/27; 579/156
[58] Field of Search ...................... 379/156, 27, 28, 32
[56] References Cited
U.S. PATENT DOCUMENTS
　4,517,409 5/1985 Nagasaki ............................ 379/156
FOREIGN PATENT DOCUMENTS
　0078253 4/1986 Japan ..................................... 379/27

Primary Examiner—Stafford D. Schreyer
Attorney, Agent, or Firm—Finnegan, Henderson, Farabow, Garrett and Dunner

[57] ABSTRACT

This invention is an electronic key telephone set including light-emitting elements for state indication, an acoustic converting element for converting a voice signal into an acoustic wave, a display unit for displaying characters and the like, operations keys, including pushbuttons, for performing an input operation, and a control unit having an operation check test function for checking functions of the telephone set including telephone set components such as the light-emitting elements, the display unit, and the acoustic converting element, for waiting for a key input after initialization is executed, if predetermined specific keys of the operation keys are operated within a predetermined time, executing the operation check test function, and if the specific keys are not operated within the predetermined time, activating a function as a normal telephone set. A button operation required for executing the operation test for functions of the telephone set is accepted for a predetermined limit time such that the button operation need only be performed within the limit time after the telephone set is connected to a switching system. The operation for executing the function operation test can be easily performed.

16 Claims, 5 Drawing Sheets

ELECTRONIC KEY TELEPHONE SET WITH FUNCTION OPERATION TEST FUNCTION AND METHOD OF CONTROLLING THE SAME

BACKGROUND OF THE INVENTION

1. Field of the Invention

The present invention relates to an electronic key telephone set in which an operation for carrying out a function operation test is simplified.

2. Description of the Related Art

An electronic key telephone set (to be referred to as an EKT hereinafter) having a CPU (microprocessor) and realizing a plurality of functions with high intelligence under the control of the CPU has been widely used.

An EKT of this type includes, e.g., pushbuttons for performing a dialing operation and the like, function keys each defining a specific function and capable of executing the function by a one-key operation, a plurality of LED (Light Emitting Diode) lamps, arranged in correspondence with the function keys, for indicating an operation state such as an execution state, a character display (liquid crystal display to be referred to as an LCD hereinafter) for displaying a message, a mode, and the like, a loudspeaker, and a microphone.

A conventional EKT, to be connected as an extension telephone to an electronic switching system, for receiving power supply from the electronic switching system and realizing various specific functions by data exchange with the electronic switching system, has, for example, the following arrangement.

An electronic switching system for performing switching between an outside line and an extension and between extensions comprises, e.g., a CPU for controlling the switching system, a memory, an exchanging switch, a power supply, a line circuit, and a trunk circuit. The CPU for switching system control is a main unit for controlling the system to operate as an electronic switching system, and the memory is used to store execution programs of the CPU, data, and the like. The memory is also used to register various messages or to record list information of I/O ports connected to extension telephones or utilization state information of extensions. The line circuit is an interface circuit for connecting an extension terminal such as an extension telephone to the electronic switching system. The line circuit exchanges signals with connected extensions or outside lines and supplies power from the power supply to extension telephones.

The EKT is detachably connected to the line circuit of the electronic switching system via a mounting cord and used as an extension telephone. The EKT receives the power from the power supply via the line circuit. The mounting cord of the EKT is connected to a communication controller arranged in the EKT. The communication controller exchanges signals with the electronic switching system therefrom.

The EKT also includes a speech controller which sends a signal supplied from the electronic switching system via the mounting cord to a loudspeaker or a handset, and sends a signal from a microphone or the handset to the electronic switching system.

The EKT also includes a CPU, a ROM (Read Only Memory), and a RAM (Random Access Memory) and obtains functions as a telephone set by the CPU as a main unit of control. In accordance with programs stored in the ROM, the CPU exchanges signals with the communication controller of the EKT, detects an operation state of a hook switch, reads the pushbuttons as dialing operation keys or the function keys, controls driving of the LED lamps or the display, controls an operation as a telephone set, executes a set function based on an operation of the function keys or a key operation of the pushbuttons provided to the EKT, and executes a function check test. The RAM temporarily stores data or is used as an execution area of programs.

When the cord of the EKT as a communication line is connected to a connector for connecting a telephone set of the electronic switching system, a predetermined DC voltage is applied from the electronic switching system to the EKT via the cord, i.e., the EKT receives power. Upon this power supply, the EKT is switched on, and the CPU of the EKT starts operating. The CPU causes an IPL (Initial Program Loader) in the ROM of the EKT to perform initialization and starts control.

The CPU of the EKT then checks whether predetermined specific keys of the pushbuttons or function keys of the EKT are depressed. If the specific keys are depressed upon control start, the CPU of the EKT executes a function check test.

In this case, the function check test is a test operation for autonomously executing various operations in order to check whether the EKT can normally perform a control operation and whether hardware is normal.

In the function check test, for example, in accordance with a predetermined operation, a ringing tone is generated from the loudspeaker, the LED lamps are turned on/off several times in a predetermined order, and then a test pattern is displayed on the display.

When the mounting cord of the EKT is connected to the connector of the electronic switching system, a current is flowed from the electronic switching system to the EKT. Therefore, the electronic switching system detects that power supply to the EKT is started. Thereafter, the electronic switching system starts switching system processing for the connected EKT.

When the EKT receives power, it checks whether or not a specific key is depressed. If the specific keys are not depressed, it starts telephone processing to perform internal control as a telephone set.

In this manner, when the EKT is connected to the electronic switching system, the function check test or the operation as a normal telephone set can be selectively started.

When the EKT is connected to the electronic switching system, however, the CPU of the EKT starts operating to check whether keys of the EKT are depressed. Therefore, in order to execute the function check test, the mounting cord of the EKT must be connected to the electronic switching system while the specific keys of the EKT are depressed.

As described above, in the conventional EKT having the function check test function for checking operation control and hardware as a telephone set, key input is checked immediately after the EKT is connected to the electronic switching system and power supply is started or the EKT is initialized by a reset operation, thereby selecting one of a mode of executing the function check test function and a mode of starting normal initialization without executing the function operation test. Only when the EKT is connected to the electronic switching system while the predetermined specific buttons are simultaneously depressed, the function operation test is started. Therefore, since specific buttons must be depressed at the same time the mounting cord of the EKT is connected to the electronic switching system, it is very difficult to start the function operation test.

SUMMARY OF THE INVENTION

It is, therefore, an object of the present invention to provide an EKT with high operability, in which a button operation for executing a function operation test need only be performed within a predetermined limit time after a connecting operation to a switching system, thereby improving operability of a function operation test executing operation.

In order to achieve the above object, the present invention has the following arrangement. That is, the present invention comprises operation keys, including keys such as pushbuttons, for performing an input operation, and a control means. When predetermined specific keys of the operation keys are operated within a predetermined time after initialization is executed, the control means starts a function operation check mode to check functions as a telephone set. If the specific keys are not operated, the control means executes normal telephone functions.

With this arrangement, when initialization is executed, the control means waits for a key input for a predetermined time after initialization is finished. If the specific keys are operated within this predetermined time, the control means starts the function operation check mode. If the specific keys are not operated within the key input waiting time, the control means starts the normal telephone operation.

As described above, even when the control means in the EKT starts control of initialization, the control means does not immediately start the operation as a telephone set but waits for the next operation for a predetermined time, so that execution of normal initialization or the function check test can be selected. Therefore, unlike in the conventional system, two operations, i.e., a connection or reset operation with respect to the electronic switching system and a specific key operation need not be simultaneously performed in order to start the function check test. As a result, the operations can be easily, sequentially performed.

According to the present invention, therefore, the two operations, i.e., the key operation required to execute the function operation test and the connection or reset operation with respect to the switching system need not be simultaneously performed but can be performed with an enough time interval therebetween. Therefore, since the operation for executing the function operation test can be easily performed, operability can be significantly improved.

DETAILED DESCRIPTION OF THE PREFERRED EMBODIMENT

Figure 1:
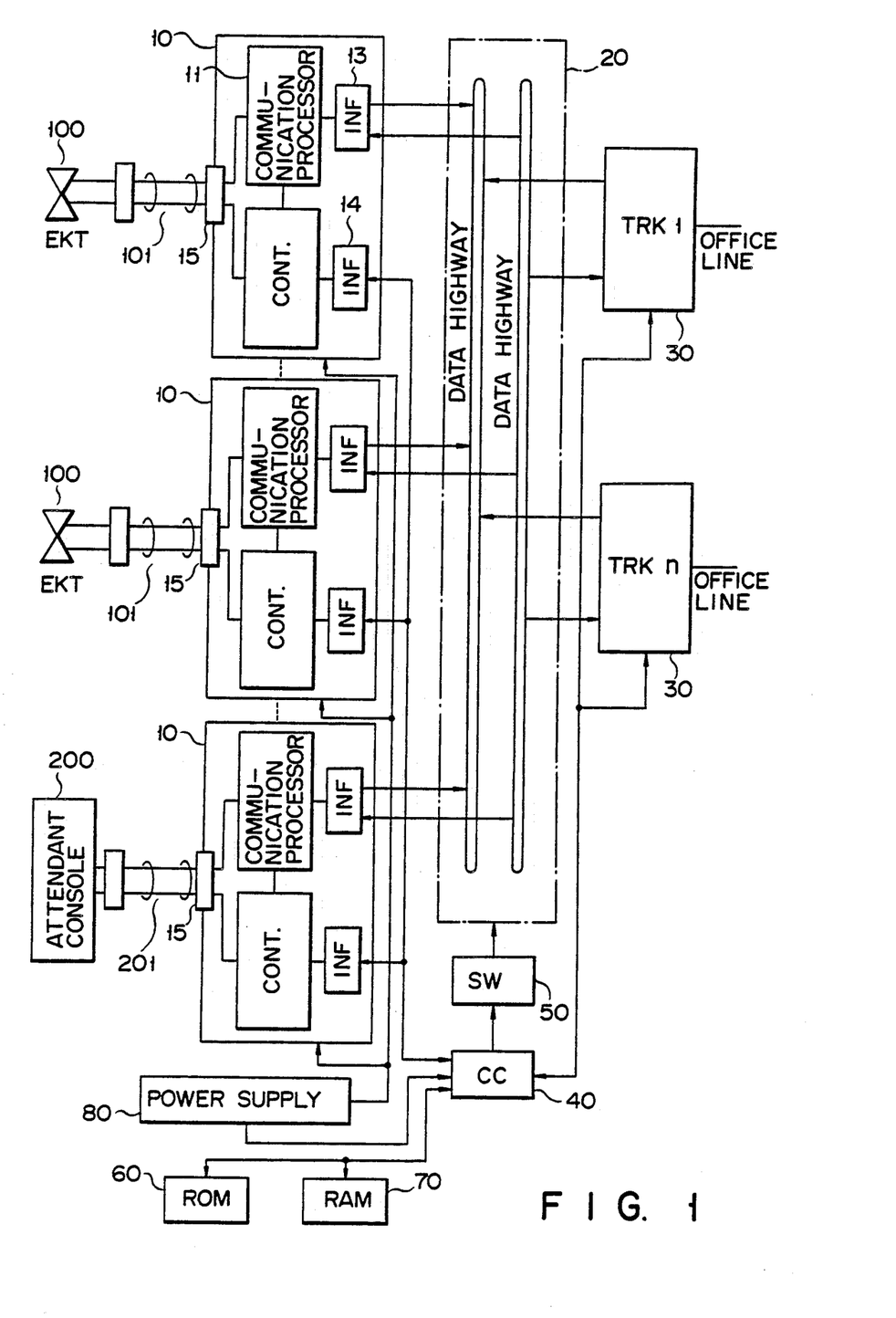
FIG. 1 is a block diagram showing a sampling circuit according to an embodiment of the present invention.

FIG. 1 is a block diagram showing an arrangement of a telephone system according the present invention. As shown in FIG. 1, an electronic switching system 1 comprises line circuits 10, a data highway 20, trunk circuits 30, a central controller 40, a time switch 50, a ROM (Read Only Memory) 60, a RAM (Random Access Memory) 70, and a power supply 80. The central controller 40 is a main unit for controlling the electronic switching system 1 and executes programs stored in the ROM 60 to realize functions as a switching system. The RAM 70 is used as a working area of or to temporarily store data of the central controller 40.

Each line circuit 10 is a connection interface with respect to a telephone terminal. The line circuit 10 is provided for each extension so that a telephone terminal is connected to the electronic switching system 1 via the line circuit 10 for each extension. The line circuit 10 includes a communication processing unit (communication processor) 11, a control unit 12, and interfaces 13 and 14. The control unit 12 is connected to the central controller 40 via the interface 14, performs control data exchange with the central controller 40 and the telephone terminal, and controls the communication processing unit 11 on the basis of the received control data. In addition, the control unit 12 supplies dial data or hook data from the telephone terminal to the central controller 40 and performs a control operation in accordance with a ringing command, speech designation, incoming designation, and the like from the central controller 40.

The communication processing unit 11 is connected to the data highway 20 via the interface 13. The communication processing unit 11 outputs voice data to the data highway 20, digitally codes a voice signal from the telephone terminal which is to be output to the data highway 20, and decodes digital reception data from the data highway 20 into a voice signal. The data highway 20 has an input line bus and an output line bus.

Each trunk circuit 30 is an interface with respect to an office line. The trunk circuit 30 detects an incoming call and forms a DC loop for line acquisition. In addition, the trunk circuit 30 digitally codes a voice signal from the office line which is to be output to the data highway 20, decodes the digital reception data received from the data highway 20 into a voice signal, and supplies the decoded voice signal to the office line.

The time switch 50 operates under the control of the central controller 40 and manages data exchange between the trunk circuits 30 and the line circuits 10 via the data highway 20. The time switch 50 has time slots assigned to the trunk circuits 30 and the line circuits 10. Each of the trunk circuits 30 and the line circuits 10 utilizes the time slot to send its transmission data to the input line bus of the data highway 20.

The time switch 50 sequentially fetches the data supplied to the bus and assigns the fetched data to the time slot of the trunk circuit 30 or the line circuit 10 as a transmission destination, thereby transmitting the data to the output line bus of the data highway 20. The trunk circuit 30 or the line circuit 10 fetches the data from the input line bus at its time slot to form a channel, thereby performing switching connection.

The power supply 80 serves as an operation power source for the respective elements constituting the electronic switching system 1 and supplies a predetermined DC voltage to a line of a voice system of each line circuit 10.

Each line circuit 10 has a line for a voice system and a line for a control system. These lines are connected to a connector 15 provided for each line circuit 10.

Each electronic key telephone (to be referred to as an EKT hereinafter) 100 used as an extension telephone has a mounting cord 101 with a connector. By connecting the mounting cord 101 to the connector 15 of the line circuit 10, the EKT 100 can be connected to the electronic switching system 1. By disconnecting the mounting cord 101 from the connector 15, the EKT 100 can be disconnected from the electronic switching system 1. An attendant console 200 for performing an operation of relaying an incoming call to an extension and the like has a mounting cord 201 with a connector. By connecting the mounting cord 201 to the connector 15 of the line circuit 10, the attendant console 200 can be connected to the electronic switching system 1. By disconnecting the mounting cord 201 from the connector 15, the attendant console 200 can be disconnected from the electronic switching system 1. The central controller 40 receives hook data representing off hook to detect a call from the EKT and receives dial data to identify a dial destination of the calling EKT. In order to form a channel with respect to the identified destination, the central controller 40 controls the time switch 50 to supply voice data from the caller to a destination time slot to be subjected to data exchange and supplies voice data from the destination to a caller time slot.

Figure 2:
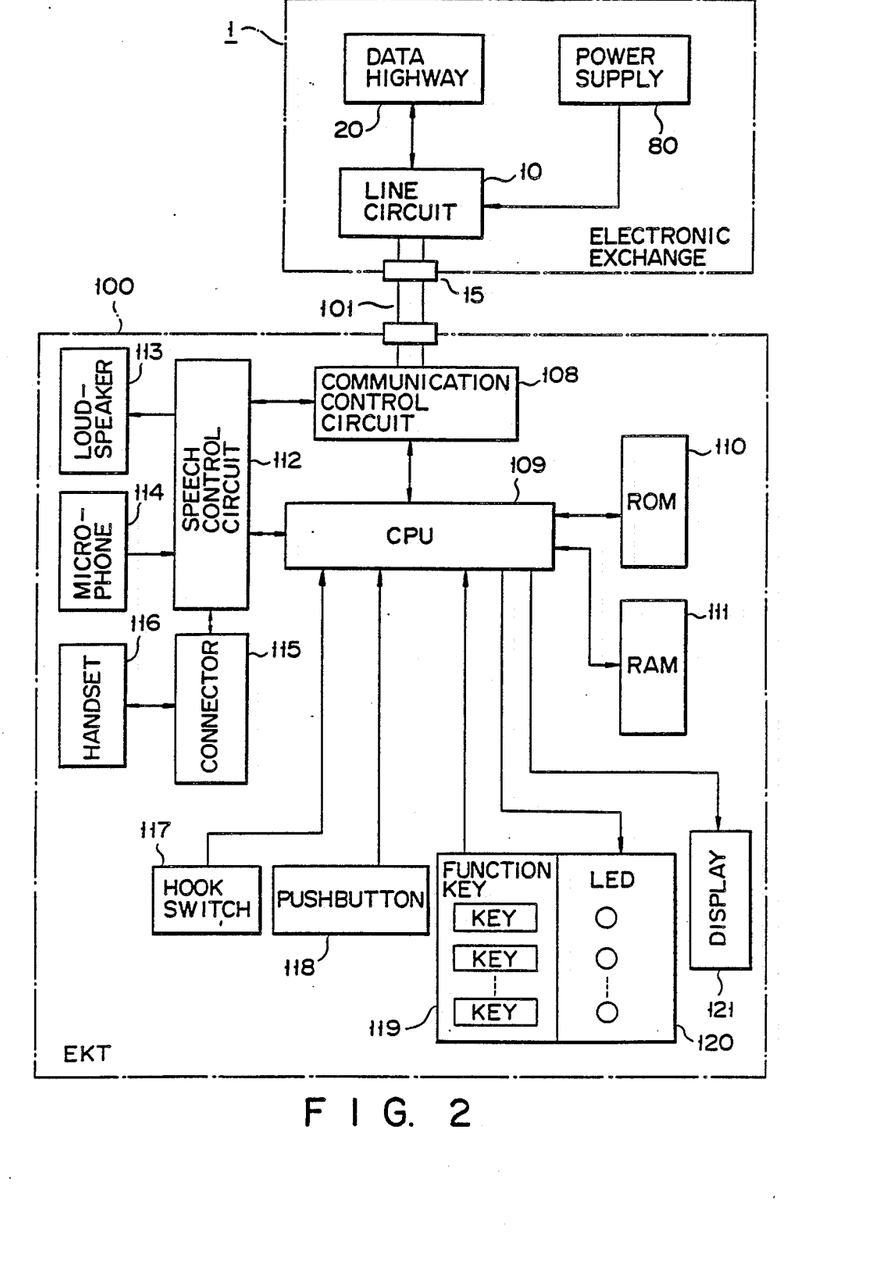
FIG. 2 is a block diagram for explaining an arrangement of an EKT.

FIG. 2 is a block diagram showing an arrangement of the EKT 100. The EKT 100 is connected to the connector 15 of the electronic switching system via the mounting cord 101.

The EKT 100 comprises a communication controller (communication control circuit) 108, a speech controller 112, a CPU (processor) 109, a ROM (Read Only Memory) 110, a RAM (Random Access Memory) 111, a loudspeaker 113, a microphone 114, a modular connector 115, a handset 116, a hook switch 117, pushbuttons 118, function keys 119, LED lamps 120, and a display 121.

The communication controller 108 exchanges signals with the electronic switching system 1 and receives power supply. The communication controller 108 is connected to the electronic switching system 1 via the mounting cord 101. The speech controller 112 sends a signal received via the communication controller 108 to the loudspeaker 113 or the handset 116 and sends a signal from the microphone 114 or the handset 116 to the communication controller 108. The modular connector 115 connects a communication terminal to the speech controller 112. By connecting the communication terminal to the speech controller 112, communication with an outside line can be performed.

The CPU 109 is a main unit for control. In accordance with programs stored in the ROM 110, the CPU 109 exchanges signals with the communication and speech controllers 108 and 112, detects an operation state of the hook switch 117, reads the pushbuttons 118 or function keys 119, controls driving of the LED lamps 120 or display 121, controls an operation as a telephone set, executes a set function based on special number input information supplied by a function key operation or the pushbuttons 118, and executes the function check test. The RAM 111 temporarily stores data or is used as an execution area for programs.

In the system of the present invention, an operation for executing the function check test of the EKT can be easily performed. For this purpose, the CPU 109 waits until a key input operation is performed for a predetermined time after power ON reset by switching on the power supply or a normal reset operation is performed. If predetermined specific keys are not operated within the predetermined time, the CPU 109 executes initialization so that the EKT functions as a telephone set. If the specific keys are operated during the wait state, the CPU 109 executes the function check test.

Programs for allowing the CPU 109 to perform the above function are stored in the ROM 110. In other words, ROM 110 stores an initializing program, a function check test program, and a normal telephone operating program. These programs are executed in accordance with the following procedure. The initializing program is executed in response to a reset operation, and then the function check test program and the normal telephone operating program are executed in accordance with the contents of key-input states during a predetermined period from the initializing. In this case, the telephone operating program is executed after the function check test program has been completed.

Figure 3:
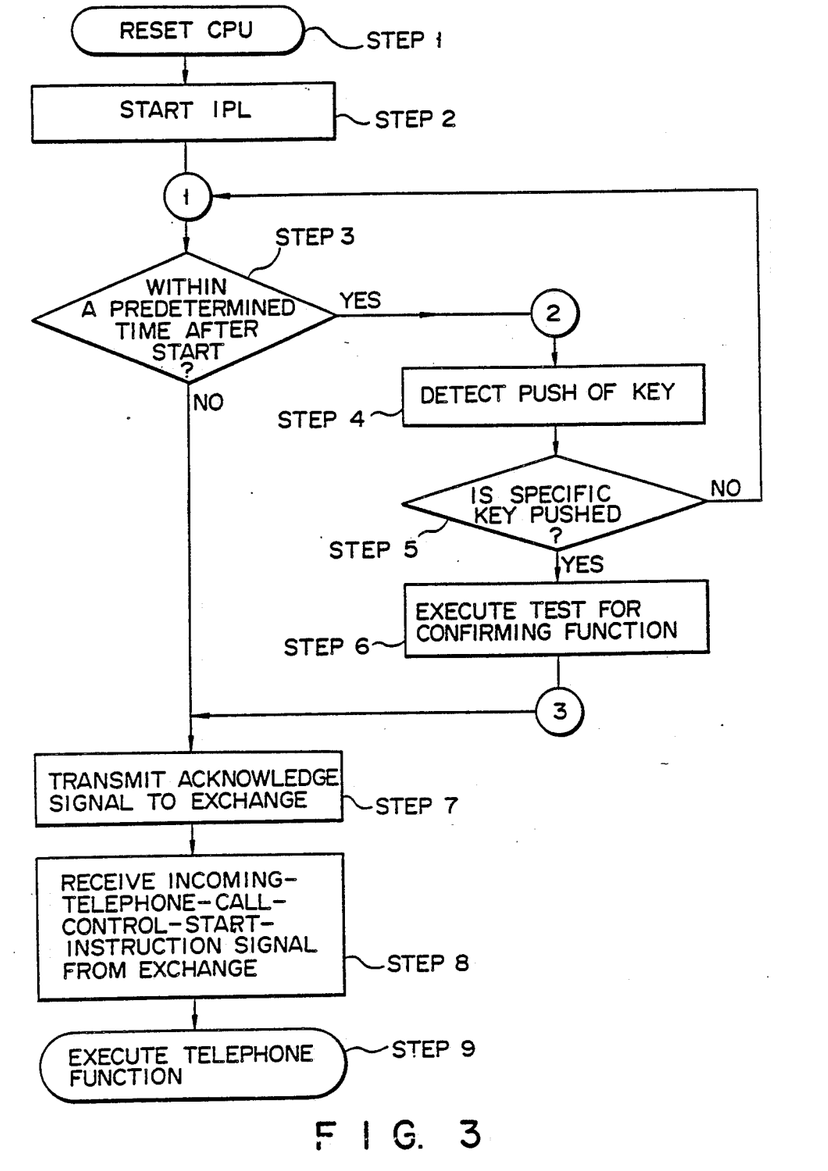
FIGS. 3, 4, and 5 are flow charts for explaining operations of the apparatus shown in FIGS. 1 and 2.

An operation of the telephone system having the above arrangement will be described below with reference to flow charts shown in FIGS. 3 and 4. Note that an operation of the electronic switching system 1 is the same as that of the conventional system.

When the EKT 100 is connected to the electronic switching system 1 via the mounting cord 101 and power is supplied from the electronic switching system 1 to the EKT 100 via the mounting cord 101, the EKT 100 is switched on. If power ON reset is performed or a reset operation is performed by operating a reset switch in the power ON state (step 1), the CPU 109 of the EKT 100 starts operating. By executing the programs stored in the ROM 110 to start control, the IPL is started (step 2). The IPL means a mode for executing the process from the initial program among the programs including the initial program and control programs which are stored in ROM 110.

The CPU 109 waits for a key input operation until a predetermined time (e.g., five to ten seconds) elapses (wait state) while monitoring time elapse by utilizing its timer function (step 3) and checks whether a key input operation of the pushbuttons 118 or the function keys is performed within this predetermined time. If the predetermined keys are not operated before the predetermined time elapses, the CPU 109 transmits an "operation start report" signal indicating that the operation as a telephone set is started to the electronic switching system 1 (step 7). If keys are operated in step 3 (step 4), the CPU 109 checks whether the operated keys are the predetermined specific keys (step 5). If the operates keys are not the specific keys, the flow returns to step 3 to execute the function check test as described above (step 6). Thereafter, the flow advances to step 7. Note that if the system is reset by power off, pulling-out of the mounting code or depression of a reset switch while the function check test is executed, the CPU 109 stops the function check test. Thereafter the process returns to step 1.

Figure 4:
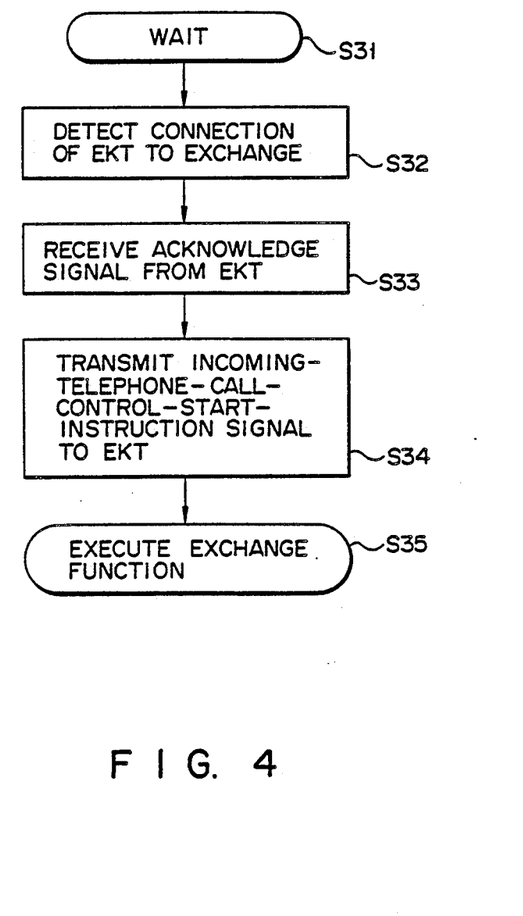

When the electronic switching system 1 is connected to the EKT 100 via the mounting cord 101 in the wait state as shown in FIG. 4 (step 31), the electronic switching system 1 starts power supply for the EKT 100 to detect connection with respect to the EKT 100 (step 32). When the electronic switching system 1 receives the "operation start report" or "acknowledge" signal from the EKT 100 (step 33), the electronic switching system 1 transmits a "call control start instruction" or "transmit incoming telephone call control start instruction" signal for instructing start of an operation as a telephone set to the EKT 100 (step 34). Thereafter, the electronic switching system 1 starts switching system processing for the EKT 100 (step 35).

After the EKT 100 transmits the "operation start report" signal to the electronic switching system 1, the EKT 100 waits for the "call control start instruction" signal from the electronic switching system 1. When the EKT 100 receives the "call control start instruction" signal via the communication controller 108 (step 8), the CPU 109 starts the telephone set processing in step, thereby performing internal control as a telephone set.

Figure 5:
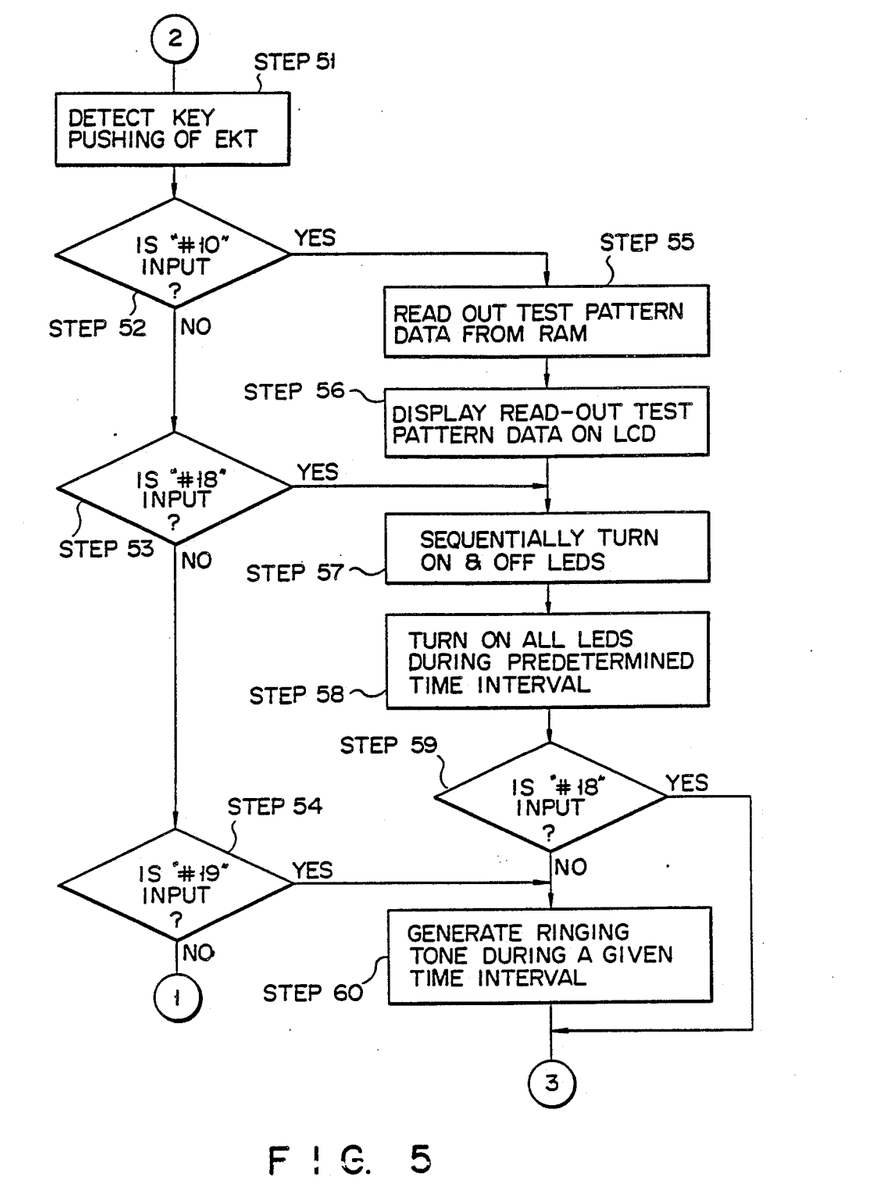

An operation of the EKT 100 from the wait state for waiting for the execution instruction of the function check test to start of the telephone set processing will be described below. FIG. 5 is a flow chart showing this operation, in which nodes ①, ②, and ③ correspond to nodes ①, ②, and ③ in the flow chart of FIG. 3.

That is, the CPU 109 checks whether the predetermined time elapses after IPL start. If the predetermined time does not elapse, the flow advances to node 2, and the CPU 109 checks whether the keys of EKT 100 are operated (step 51).

In this case, assume that in the function check test, a predetermined test pattern is displayed on the LCD display 121, the LED lamps are turned on/off several times and then simultaneously turned on for a predetermined time, and a ringing tone is generated from the loudspeaker 113 for a predetermined time. These operations are executed by the programs stored in the ROM of the EKT.

In order to instruct execution of the function check test of the EKT 100, when "#", "1", and "0" of the pushbuttons 118 are depressed in this order, i.e., "#10" is input as a special number input operation, i.e., a specific key operation, execution of the overall function check test is instructed. If "#", "1", and "8" are depressed in this order, i.e., "#18" is input, execution of the function check test excluding test pattern display is instructed. If "#", "1", and "9" are depressed in this order, execution of the function check test excluding test pattern display and the LED lamp operation check is instructed.

If "#10" is input by operating the keys of the EKT 100 in step 51, this is determined in step 52, and the flow advances to step 55. In step 55, test pattern display data for the LCD display check is read out from the RAM, and the flow advances to step 56. In step 56, the readout test pattern display data is supplied to the LCD display 121 to display a predetermined test pattern. The LED lamps are sequentially turned on/off several times and then simultaneously turned on for a predetermined time (steps 57 and 58). The flow advances to step 59, and the CPU 109 checks whether "#18" is input by the key operation. If "#18" is not input, a ringing tone is generated from the loudspeaker 113 (step 60). Thereafter, the flow advances to node ③, and an operation from step 7 is executed. If the CPU 109 determines in step 59 that "#18" is input by the key operation, the flow skips step 60 and advances to node ③, and the operation from step 7 is executed.

If the CPU 109 determines in step 52 that "#10" is not input, it checks whether "#18" is input (step 53). If "#18" is input, an operation from step 57 is executed. If "#18" is not input in step 53, the flow advances to step 54, and the CPU 109 checks whether "#19" is input by the key operation of the EKT 100. If "#19" is input, step 60 is executed. If "#19" is not input in step 53, the flow returns to node ① in the flow chart shown in FIG. 3.

In this manner, in accordance with the special number input, the function check test of the EKT 100 can be entirely or partially executed. When one of the three devices, i.e., the speaker, the LED, and the LCD, which has the shortest lifetime, is tested, it can be, inferred from the results of the test, whether the other two devices having longer lifetimes function well or not. Hence, the function check test can be partially executed in accordance with the special number input, whereby the test efficiency is enhanced.

In the above embodiment, the function check test is sequentially performed in units of components by driving the components in a predetermined manner so that a tester can observe the operations. However, the test results can be displayed on the LCD after the test.

More specifically, the results of the test on each device are stored into the RAM 111 upon completion of the test. After all devices have been tested, the results of the test on all devices are read from the RAM 111. If the test results show that all devices function well, then the message "TEST OK" is displayed. If the test results show that even only one of the devices malfunctions, then the message "TEST NG" is displayed, or a list of the well-functioning device and the malfunctioning devices is displayed. If an abnormality is detected by the function check test, the EKT supplies a signal representing the abnormality to the electronic switching system. The electronic switching system can have a function of not connecting the corresponding EKT when this signal is received. As a result, a trouble caused by connecting a defective EKT can be prevented. In addition, if an EKT signaling an abnormality to the electronic switching system is present, a message representing occurrence of a defective EKT can be automatically supplied as a voice or characters to a predetermined telephone set in a maintenance department. As a result, maintenance of the EKT can be immediately performed.

As described above, the EKT of the present invention has the pushbuttons as keys used for the dial input operation and the like and the function keys assigned with specific functions. The EKT performs an input operation by using these keys and is controlled by the CPU so as to function as a telephone set. Upon initialization executed by the CPU, when predetermined specific keys of the pushbuttons or function keys are operated, the function operation check mode is set to check functions of the telephone set. If the specific keys are not operated, an operation as a normal telephone set is started. In this EKT, the CPU has a wait function of waiting for a key input for a predetermined time after initialization. If the specific keys are operated within this key input waiting time according to the wait function, a function operation check mode is started. If the specific keys are not operated within the predetermined time, the function as a normal telephone set is started.

As described above, even after the CPU in the EKT starts controlling the initialization processing, the CPU does not immediately start the operation as a telephone set but waits for a specific key operation for a predetermined time. Therefore, the operation check test mode can be set within this predetermined time. If the specific key operation is not performed within this predetermined time, initialization can be normally performed. Therefore, unlike in the conventional system, two operations. i.e.. the connection operation with respect to the switching system or reset operation and the specific key operation need not be simultaneously performed in order to set the function check test. As a result, since the operations can be easily, sequentially performed, operability is significantly improved.

According to the present invention, therefore, there is provided an EKT with high operability, in which a function operation test can be easily executed.

Note that the present invention is not limited to above embodiment shown in the accompanying drawings but can be arbitrarily modified without departing from the spirit and scope of the invention.

What is claimed is:

1. An electronic key telephone set comprising:
   a light-emitting means for state indication;
   an acoustic converting means for converting a voice signal into an acoustic wave;
   display means for displaying characters and the like;
   operation key means for starting an operation; and
   control means, for initializing said electronic key telephone set when said electronic key telephone set is connected to an external exchange, said control means including a self-test means for sequentially testing said light-emitting means, said acoustic converting means, and said display means, when said operation key means is actuated within a predetermined period after said electronic key telephone set was initialized, and a means for setting said electronic key telephone set to a normal mode after a completion of the testing function.

2. An electronic key telephone set according to claim 1, wherein said self-test means includes memory means for storing a self-test instruction data by which the self-test operation is executed.

3. An electronic key telephone set according to claim 1, wherein said light-emitting element means has a plurality of said light-emitting elements; and
   said self-test means executes the self-test such that said light-emitting elements are sequentially turned on and then simultaneously turned on, to check said light-emitting elements.

4. An electronic key telephone set according to claim 1, wherein said self-test means executes the self-test such that said acoustic converting means generates a predetermined test tone.

5. An electronic key telephone set according to claim 1, wherein said self-test means executes the self-test such that said display means displays a predetermined test pattern.

6. An electronic key telephone set according to claim 1, wherein the said control means specifies at least one check to be executed, in accordance with the key operation of said operation key means.

7. An electronic key telephone set comprising a plurality of operation means including operation key means and control means,
   said operation key means including:
   a plurality of operation keys, for performing an input operation; and
   said control means including means for checking said operation means, said control means waiting for key input for a predetermined period of time after initialization, starting the checking if predetermined specific keys of said operation key means are operated within said predetermined period of time, and activating a function as a normal telephone set, if the checking is completed or if said specific keys are not operated within said predetermined period of time.

8. An electronic key telephone set comprising a plurality of operation means including operation key means and control means,
   said operation key means including:
   a plurality of operation keys, for performing an input operation; and
   said control means including means for checking said operation means, said control means waiting for key input for a predetermined period of time after initialization, starting the checking if predetermined specific keys of said operation key means are operated within said predetermined period of time, and for activating a function as a normal telephone set, if the checking is completed or if said specific keys are not operated within said predetermined period of time, and
   wherein said control means performs a predetermined linking operation with respect to a switching system and activates a function as a normal telephone set.

9. An electronic key telephone set according to claim 8, wherein said control means performs the linking operation wherein an operation start report signal representing that the operation as a telephone set is started is supplied to said switching system.

10. An electronic key telephone set according to claim 8, wherein said control means performs the linking operation wherein an operation start report signal representing that the operation as a telephone set is started is supplied to said switching system, and a recognition report signal is supplied from said switching system to said control means.

11. An electronic key telephone set according to claim 8, wherein said control means performs the link operation having a function for sending an operation start report signal to the switching system and making said control means in a stand-by condition, when a predetermined self-test executed by said control means results in a normal condition, and a function for allowing said switching system to issue a call control start instruction in response to the operation start report signal and for permitting said electronic key telephone set to operate as a conventional telephone when said electronic key telephone set receives the call control start instruction.

12. An electronic key telephone set comprising:
    input means for performing an input operation;
    output means for outputting indication information; and
    control means, including initialization means for initializing said key telephone set when said key telephone set is connected to an external exchange, self-testing means for self-checking a function of said output means after the initializing of said key telephone set, and normal telephone set operation means for executing a normal telephone set operation after a completion of the checking operation of said self-testing means.

13. A method of controlling an electronic key telephone set, comprising:
    the first step of setting said telephone set to wait for a key input for a predetermined period of time after initialization is executed;
    the second step of executing an operation check test if predetermined specific keys of said telephone set are operated within the predetermined period of time; and the third step of activating a function as a normal telephone set after said second step is executed or if said specific keys are not operated within the predetermined period of time.

14. A method according to claim 13, wherein a check to be executed is specified in accordance with the operation of said specific keys in the operation check test.

15. A method of controlling an electronic key telephone set comprising:
   a first step for waiting the input from input means during a predetermined period from an initialization;
   a second step for executing an operation confirmation test when a specific data is input from said input means within said predetermined period;
   a third step for operating said telephone set with a normal mode when the specific data is not input after the execution of said second step or within said predetermined period.

16. An electronic key telephone set comprising:
input means for performing an input operation;
output means for outputting indication information; and
control means for controlling operation of said electronic key telephone set; said control means including a processor, a memory including an initial program loader, initializing means for initializing said key telephone set by executing the initial program loader when said key telephone set is connected to an external exchange, and self-testing means for self-checking a function of said output means after the initializing of said key telephone set, said processor executing a normal telephone set operation after a completion of the checking operation of said self-testing means.

* * * * *